US012747191B2

(12) United States Patent
Chou et al.

(10) Patent No.: US 12,747,191 B2
(45) Date of Patent: Sep. 29, 2026

(54) COMPOSITE CERAMIC SUBSTRATE HAVING MULTI-LAYER CONFIGURATION

(71) Applicant: TONG HSING ELECTRONIC INDUSTRIES, LTD., Taipei City (TW)

(72) Inventors: Kai-Mou Chou, Taipei City (TW); Shih-Han Wu, Taipei City (TW); Jhih-Wei Lai, Taipei City (TW); Jian-Yu Shih, Taipei City (TW)

(73) Assignee: TONG HSING ELECTRONIC INDUSTRIES, LTD., Taipei City (TW)

( * ) Notice: Subject to any disclaimer, the term of this patent is extended or adjusted under 35 U.S.C. 154(b) by 357 days.

(21) Appl. No.: 18/449,680

(22) Filed: Aug. 14, 2023

(65) Prior Publication Data

US 2024/0360043 A1 Oct. 31, 2024

(30) Foreign Application Priority Data

Apr. 27, 2023 (TW) ................................ 112115694
May 24, 2023 (TW) ................................ 112119219

(51) Int. Cl.
*C04B 37/02* (2006.01)
*C04B 41/00* (2006.01)
(Continued)

(52) U.S. Cl.
CPC .......... *C04B 37/021* (2013.01); *C04B 37/023* (2013.01); *C04B 41/009* (2013.01);
(Continued)

(58) Field of Classification Search
CPC ... C04B 37/021; C04B 37/023; C04B 41/009; C04B 41/5032; C04B 41/5063
(Continued)

(56) References Cited

U.S. PATENT DOCUMENTS 4,950,558 A 8/1990 Sarin
5,355,281 A * 10/1994 Adelmann .......... H10W 40/255 257/729

(Continued)

FOREIGN PATENT DOCUMENTS

CN 104362099 A 2/2015
CN 109336635 A 2/2019

(Continued)

OTHER PUBLICATIONS

Machine_English_translation_WO_9854761_A1; Sasaki; Copper Circuit Junction Substrate and Method of producing the same; Dec. 3, 1998; EPO; whole document (Year: 2026).*

*Primary Examiner* — Tahseen Khan
(74) *Attorney, Agent, or Firm* — Li & Cai Intellectual Property Office

(57) ABSTRACT

A composite ceramic substrate having multi-layer configuration includes a nitride ceramic core layer, two composite layers respectively formed on two opposite sides of the nitride ceramic core layer, and two ceramic covering layers that are respectively formed on the two composite layers. Each of the two ceramic covering layers is coated on the corresponding composite layer so as to be jointly sintered to the nitride ceramic core layer. Each of the two ceramic covering layers and the nitride ceramic core layer are of different materials, and a composite material of each of the two composite layers includes the material of the ceramic covering layer connected thereto and the material of the nitride ceramic core layer. A sum of the thicknesses of the two ceramic covering layers and the thicknesses of the two composite layers is less than or equal to a thickness of the nitride ceramic core layer.

16 Claims, 9 Drawing Sheets

(51) Int. Cl.
*C04B 41/50* (2006.01)
*C04B 41/52* (2006.01)
*C04B 41/87* (2006.01)
*C04B 41/89* (2006.01)

(52) U.S. Cl.
CPC ...... *C04B 41/5032* (2013.01); *C04B 41/5063* (2013.01); *C04B 41/5064* (2013.01); *C04B 41/5066* (2013.01); *C04B 41/522* (2013.01); *C04B 41/87* (2013.01); *C04B 41/89* (2013.01); *C04B 2237/366* (2013.01); *C04B 2237/368* (2013.01); *C04B 2237/407* (2013.01); *C04B 2237/60* (2013.01)

(58) Field of Classification Search
USPC .......................................................... 428/216
See application file for complete search history.

(56) References Cited

U.S. PATENT DOCUMENTS

| | | | |
|---|---|---|---|
| 6,086,990 A | 7/2000 | Sumino et al. | |
| 6,284,356 B1 * | 9/2001 | Kiriyama | C23C 30/005 51/307 |
| 2021/0101840 A1 | 4/2021 | Kimura et al. | |
| 2021/0134639 A1 | 5/2021 | Atsuji | |

FOREIGN PATENT DOCUMENTS

| | | | | |
|---|---|---|---|---|
| CN | 111217611 A | 6/2020 | | |
| CN | 111908924 A | 11/2020 | | |
| WO | WO-9854761 A1 * | 12/1998 | H10W 40/255 | |
| WO | WO2020212438 A1 | 10/2020 | | |

* cited by examiner

COMPOSITE CERAMIC SUBSTRATE HAVING MULTI-LAYER CONFIGURATION

CROSS-REFERENCE TO RELATED PATENT APPLICATION

This application claims the benefit of priority to Taiwan Patent Application No. 112115694 filed on Apr. 27, 2023 and Taiwan Patent Application No. 112119219 filed on May 24, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a ceramic substrate, and more particularly to a composite ceramic substrate having a multi-layer configuration.

BACKGROUND OF THE DISCLOSURE

A conventional ceramic substrate is a single layer structure, so that the conventional ceramic substrate is made of a material having a single composition. Accordingly, the application of the conventional ceramic substrate is limited.

SUMMARY OF THE DISCLOSURE

In response to the above-referenced technical inadequacies, the present disclosure provides a composite ceramic substrate having a multi-layer configuration for effectively improving on the issues associated with conventional ceramic substrates.

In order to solve the above-mentioned problems, one of the technical aspects adopted by the present disclosure is to provide a composite ceramic substrate having a multi-layer configuration, which includes a nitride ceramic core layer, two composite layers, and two ceramic covering layers. The nitride ceramic core layer has two ceramic surfaces spaced apart from each other along a thickness direction by a predetermined thickness. The two composite layers are respectively formed on the two ceramic surfaces of the nitride ceramic core layer. The two ceramic covering layers are respectively coated onto the two composite layers to be jointly sintered to the nitride ceramic core layer. Moreover, a material of each of the two ceramic covering layers is different from a material of the nitride ceramic core layer, and a composite material of each of the two composite layers includes the material of the ceramic covering layer connected thereto and the material of the nitride ceramic core layer. Each of the two ceramic covering layers overlaps with at least 80% of an area of a corresponding one of the two ceramic surfaces along the thickness direction, and a sum of thicknesses of the two ceramic covering layers and thicknesses of the two composite layers is less than or equal to the predetermined thickness.

In order to solve the above-mentioned problems, another one of the technical aspects adopted by the present disclosure is to provide a composite ceramic substrate having a multi-layer configuration, which includes a nitride ceramic core layer and two ceramic covering layers. The nitride ceramic core layer has two ceramic surfaces spaced apart from each other along a thickness direction by a predetermined thickness. The two ceramic covering layers are respectively coated onto the two ceramic surfaces of the nitride ceramic core layer to be jointly sintered together. Each of the two ceramic covering layers overlaps with at least 80% of an area of a corresponding one of the two ceramic surfaces along the thickness direction, and a sum of thicknesses of the two ceramic covering layers is less than or equal to the predetermined thickness.

In order to solve the above-mentioned problems, yet another one of the technical aspects adopted by the present disclosure is to provide a composite ceramic substrate having a multi-layer configuration, which includes a nitride ceramic core layer and two ceramic covering layers. The nitride ceramic core layer has two ceramic surfaces spaced apart from each other along a thickness direction by a predetermined thickness. The nitride ceramic core layer is a silicon nitride layer having a first $\alpha$-phase crystal structure and a first $\beta$-phase crystal structure. Moreover, a weight percentage of the first $\alpha$-phase crystal structure of the nitride ceramic core layer is less than a weight percentage of the first-phase crystal structure of the nitride ceramic core layer. The two ceramic covering layers are respectively coated onto the two ceramic surfaces of the nitride ceramic core layer to be jointly sintered together. Each of the two ceramic covering layers is a silicon nitride layer having a second $\alpha$-phase crystal structure and a second-phase crystal structure. Moreover, in each of the two ceramic covering layers, a weight percentage of the second $\alpha$-phase crystal structure is greater than a weight percentage of the second $\beta$-phase crystal structure. Each of the two ceramic covering layers overlaps with at least 80% of an area of a corresponding one of the two ceramic surfaces along the thickness direction, and a sum of thicknesses of the two ceramic covering layers is less than or equal to the predetermined thickness.

Therefore, the composite ceramic substrate of the present disclosure is provided with a specific multi-layer configuration (e.g., the two opposite sides of the nitride ceramic core layer are respectively provided with the two ceramic covering layers) that is different from the conventional configuration, so that the composite ceramic substrate can have a composite effect to expand its range of application and meet more diverse requirements.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
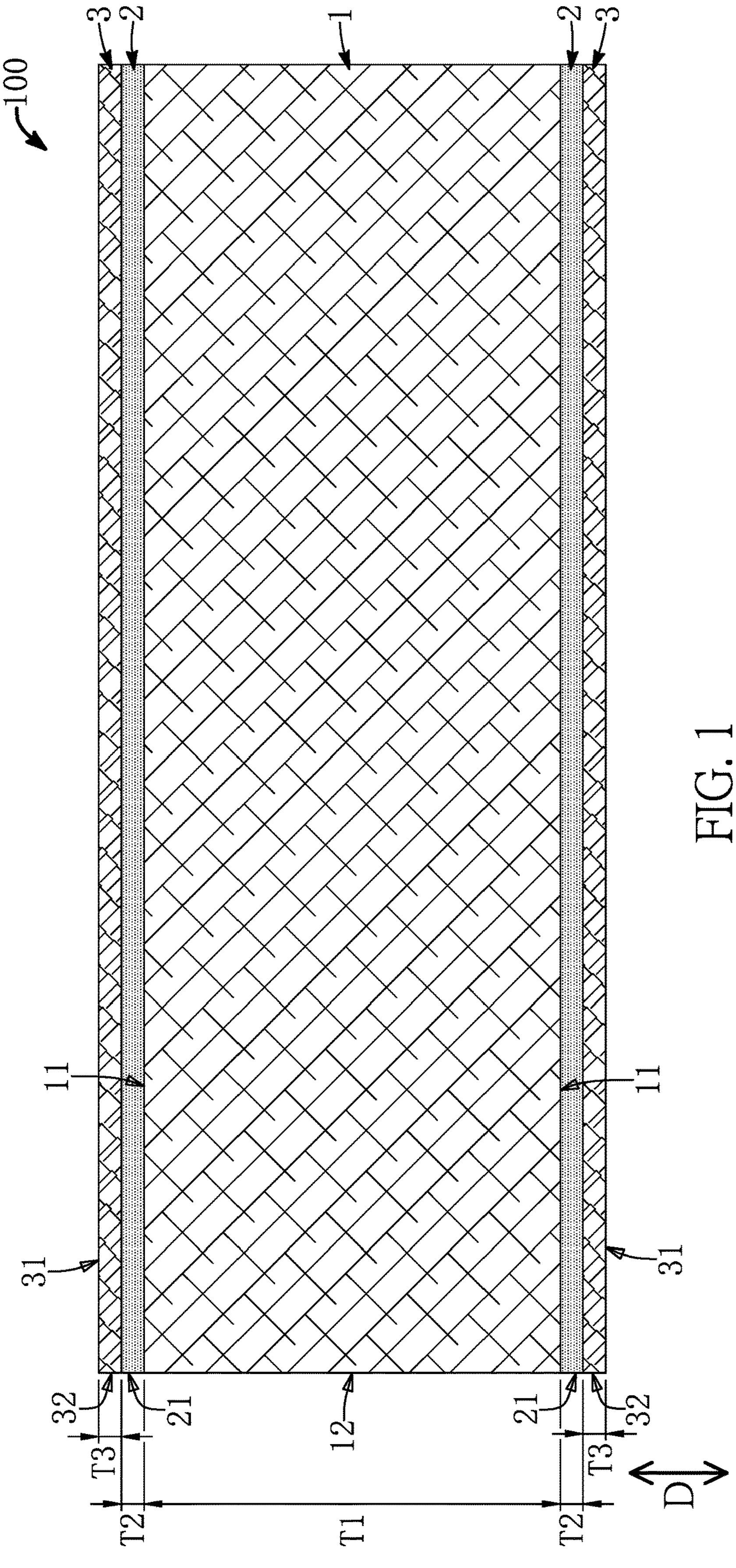
FIG. 1 is a schematic cross-sectional view of a composite ceramic substrate having a multi-layer configuration according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
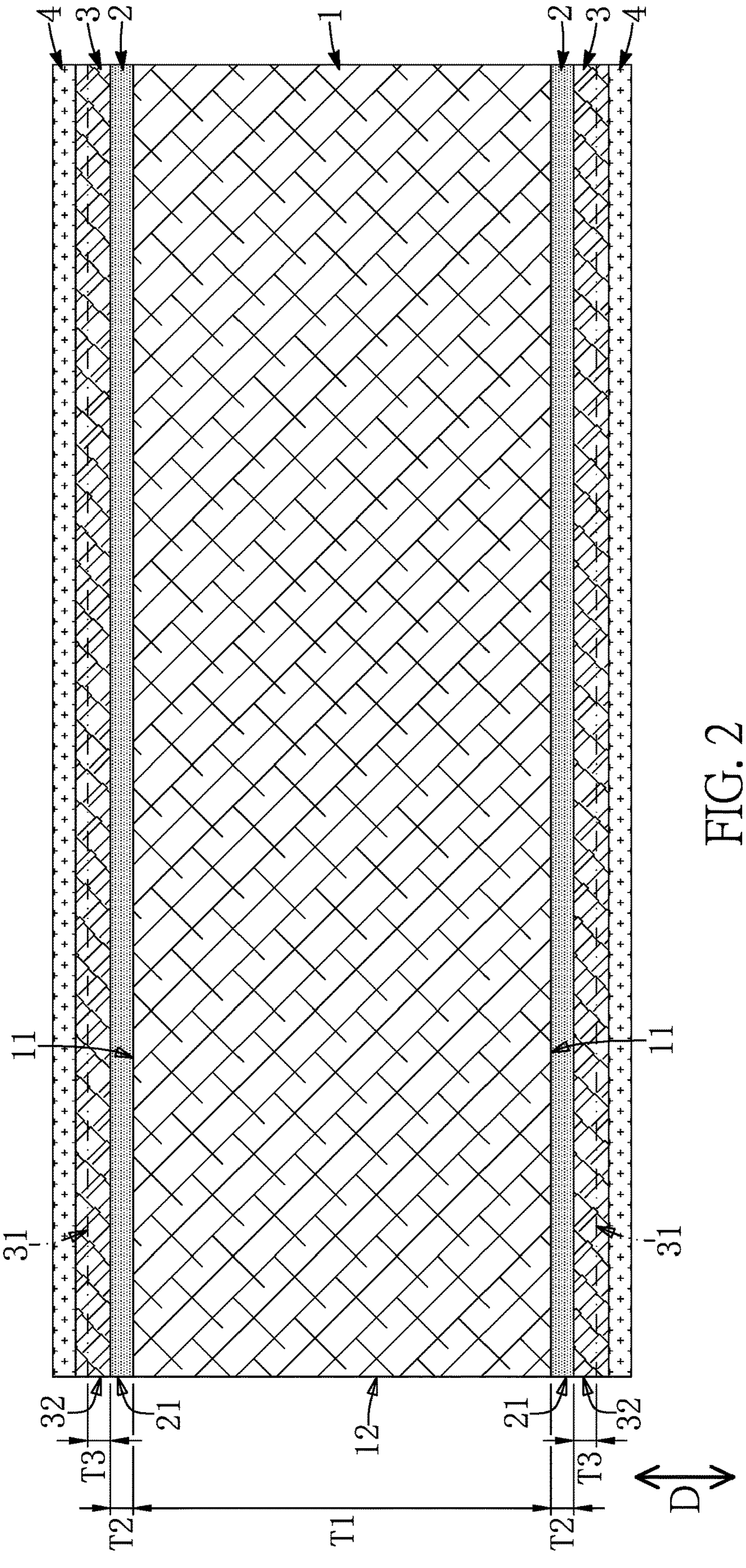
FIG. 2 is a schematic cross-sectional view showing a semifinished product of the composite ceramic substrate of FIG. 1.

Referring to FIG. 1 to FIG. 2, a first embodiment of the present disclosure is provided. As shown in FIG. 1, the present embodiment provides a composite ceramic substrate 100 having a multi-layer configuration, which includes a nitride ceramic core layer 1, two composite layers 2 respectively formed on two opposite surfaces of the nitride ceramic core layer 1, and two ceramic covering layers 3 that are respectively formed on the two composite layers 2. In other words, the nitride ceramic core layer 1 and any one of the two ceramic covering layers 3 are provided with one of the composite layers 2 sandwiched therebetween. It should be noted that any composite substrate having multiple ceramic layers is different from the nitride ceramic core layer 1 provided by the present embodiment.

The nitride ceramic core layer 1 is a silicon nitride ($Si_3N_4$) layer or an aluminum nitride (AlN) layer, and the nitride ceramic core layer 1 has two ceramic surfaces 11 spaced apart from each other along a thickness direction D by a predetermined thickness T1. In the present embodiment, the two ceramic surfaces 11 are flat and are substantially parallel to each other, and the predetermined thickness T1 can be at least 150 μm (e.g., the predetermined thickness T1 can be within a range from 150 μm to 1500 μm).

The two composite layers 2 are respectively formed on the two ceramic surfaces 11 of the nitride ceramic core layer 1. In the present embodiment, any one of the two ceramic surfaces 11 of the nitride ceramic core layer 1 is entirely covered by one of the two composite layers 2. Each of the two composite layers 2 has a thickness T2 being uniform and being less than or equal to 50 μm, but the present disclosure is not limited thereto.

Specifically, a composite material of each of the two composite layers 2 includes a material of the ceramic covering layer 3 connected thereto and a material of the nitride ceramic core layer 1, and a coefficient of thermal expansion (CTE) of each of the two composite layers 2 is between a CTE of the ceramic covering layer 3 connected thereto and a CTE of the nitride ceramic core layer 1 (e.g., a CTE of the composite ceramic substrate 100 gradually decreases in a direction from a center of the composite ceramic substrate 100 toward an external environment), thereby increasing a compatibility among layers of the composite ceramic substrate 100.

The two ceramic covering layers 3 are respectively coated (e.g., printed) onto the two composite layers 2 to be jointly sintered to the nitride ceramic core layer 1. Before that (e.g., before the above sintering process), as shown in FIG. 2, the two ceramic covering layers 3 can be provided with two isolation layers 4 respectively formed on outer sides thereof, and the two composite layers 2, the two ceramic covering layers 3, and the two isolation layers 4 are sintered to the nitride ceramic core layer 1 at a temperature of 1650° C. to 1900° C. so as to jointly become a stacked structure. Finally, as shown in FIG. 1, the stacked structure can be processed in a physical manner (e.g., a sandblasting manner) to remove the two isolation layers 4 and to reduce a thickness T3 of each of the two ceramic covering layers 3, until the thickness T3 of each of the two ceramic covering layers 3 is within a range from 5 μm to 50 μm.

Each of the two isolation layers 4 can be a boron nitride (BN) layer or an aluminum nitride layer. Moreover, an outer surface 31 of each of the two ceramic covering layers 3 in the present embodiment is a processed surface that is formed in the physical manner (e.g., the sandblasting manner) and that is preferably parallel to any one of the two ceramic surfaces 11. Accordingly, a flatness and an overall thickness of the composite ceramic substrate 100 in the present embodiment can be precisely controlled through the two processed surfaces. For example, a sum of the thicknesses T3 of the two ceramic covering layers 3 and the thickness T2 of the two composite layers 2 is less than or equal to the predetermined thickness T1, and the thickness T3 of any one of the two ceramic covering layers 3 is preferably greater than or equal to the thickness T2 of a corresponding one of the two composite layers 2 connected thereto.

Specifically, the material of each of the two ceramic covering layers 3 is limited to being different from the material of the nitride ceramic core layer 1. For example, when the nitride ceramic core layer 1 is a silicon nitride ($Si_3N_4$) layer, each of the two ceramic covering layers 3 can be an aluminum nitride (AlN) layer, an aluminum oxide ($Al_2O_3$) layer, or a zirconia toughened alumina (ZTA) layer; or, when the nitride ceramic core layer 1 is an aluminum nitride layer, each of the two ceramic covering layers 3 can be a silicon nitride layer, an aluminum oxide layer, or a zirconia toughened alumina layer, but the present disclosure is not limited thereto.

In other words, each of the two ceramic covering layers 3 overlaps with at least 80% of an area of a corresponding one of the two ceramic surfaces 11 along the thickness direction D. In the present embodiment, outer lateral sides 12 of the nitride ceramic core layer 1, outer lateral sides 21 of the two composite layers 2, and outer lateral sides 32 of the two ceramic covering layers 3 are flush (or coplanar) with each other along the thickness direction D; that is to say, a portion of the nitride ceramic core layer 1 exposed in the external environment provided by the present embodiment can only be the outer lateral sides 12. Moreover, with respect to the nitride ceramic core layer 1, any one of the two ceramic covering layers 3 and the composite layer 2 connected thereto are mirror-symmetrical to another one of the two ceramic covering layers 3 and the composite layer 2 connected thereto, but the present disclosure is not limited thereto.

In summary, the composite ceramic substrate 100 of the present disclosure is provided with a specific multi-layer configuration (e.g., the two opposite sides of the nitride ceramic core layer 1 are respectively provided with the two ceramic covering layers 3 being made of the material different from that of the nitride ceramic core layer 1) that is different from the conventional configuration, so that the composite ceramic substrate 100 can have a composite effect to expand its range of application and meet more diverse requirements.

It should be noted that the composite ceramic substrate 100 provided by the present embodiment is limited to having the specific multi-layer configuration. In other words, according to design requirements, the composite ceramic substrate 100 provided by the present embodiment can be regarded as consisting of the nitride ceramic core layer 1, the two composite layers 2 respectively formed on the two opposite surfaces of the nitride ceramic core layer 1, and the two ceramic covering layers 3 that are respectively formed on the two composite layers 2, but the present disclosure is not limited thereto.

Second Embodiment

Figure 3:
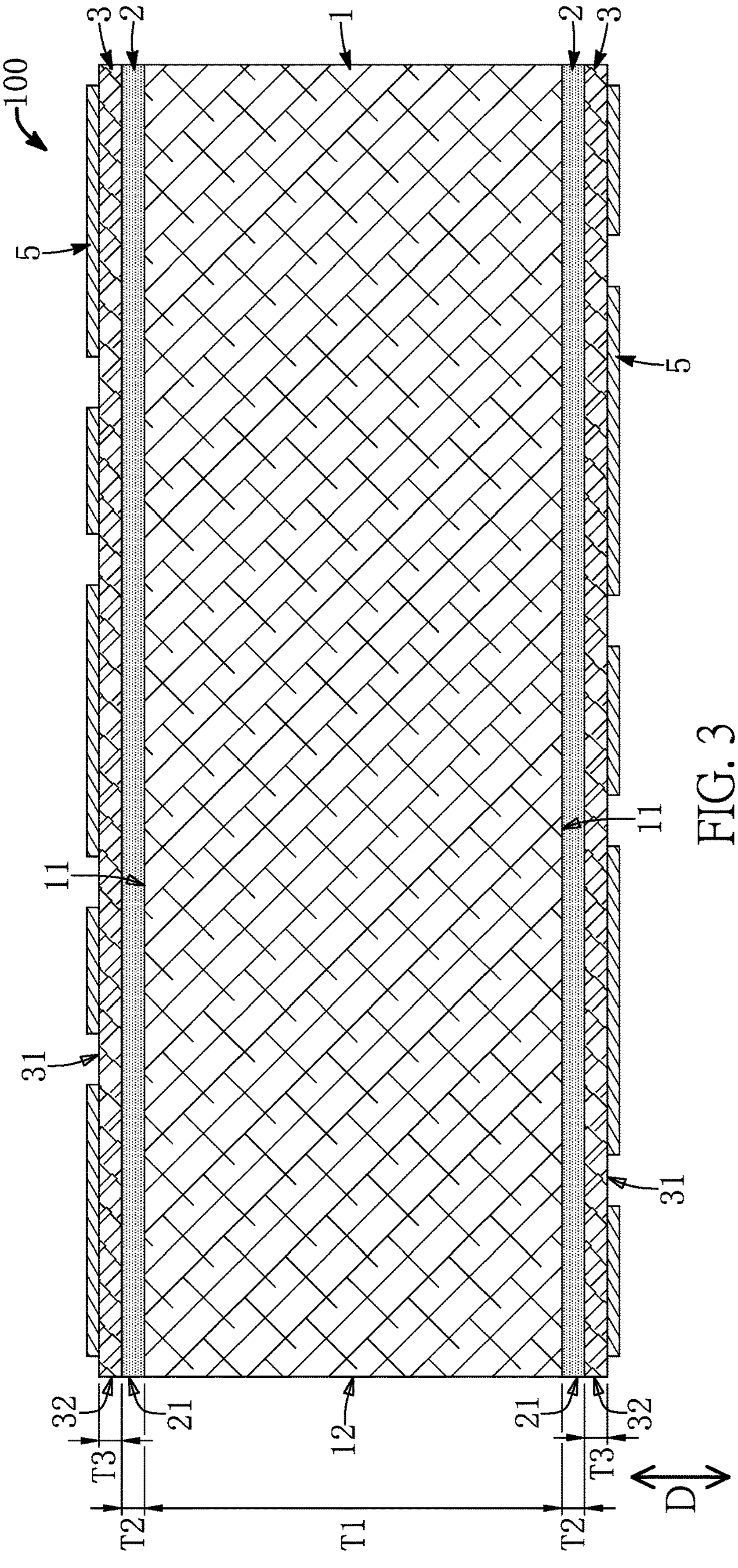
FIG. 3 is a schematic cross-sectional view of the composite ceramic substrate according to a second embodiment of the present disclosure.

Referring to FIG. 3, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the present embodiment, the nitride ceramic core layer 1 is a silicon nitride layer, and each of the two ceramic covering layers 3 is an aluminum nitride layer, so that the composite ceramic substrate 100 can further include two copper layers 5 respectively formed on the outer surfaces 31 of the two ceramic covering layers 3 in a direct plated copper (DPC) manner. In other words, any one of the two copper layers 5 in the present embodiment can be referred to as a DPC layer.

Accordingly, the composite ceramic substrate 100 of the present disclosure is provided with a specific multi-layer configuration, where the two opposite sides of the silicon nitride layer are respectively provided with the two aluminum nitride layers, so that each of the two copper layers 5 and a corresponding one of the two aluminum nitride layers can have a high bonding force by the DPC manner, thereby effectively solving a problem associated with a conventional silicon nitride ceramic substrate that cannot be used in the DPC manner.

It should be noted that the composite ceramic substrate 100 provided by the present embodiment is limited to having the specific multi-layer configuration. In other words, according to design requirements, the composite ceramic substrate 100 provided by the present embodiment can be regarded as consisting of the silicon nitride layer, the two composite layers 2 respectively formed on the two opposite surfaces of the silicon nitride layer, the two aluminum nitride layers that are respectively formed on the two composite layers 2, and the two copper layers 5 that are respectively formed on the two aluminum nitride layers in the DPC manner, but the present disclosure is not limited thereto.

Third Embodiment

Figure 4:
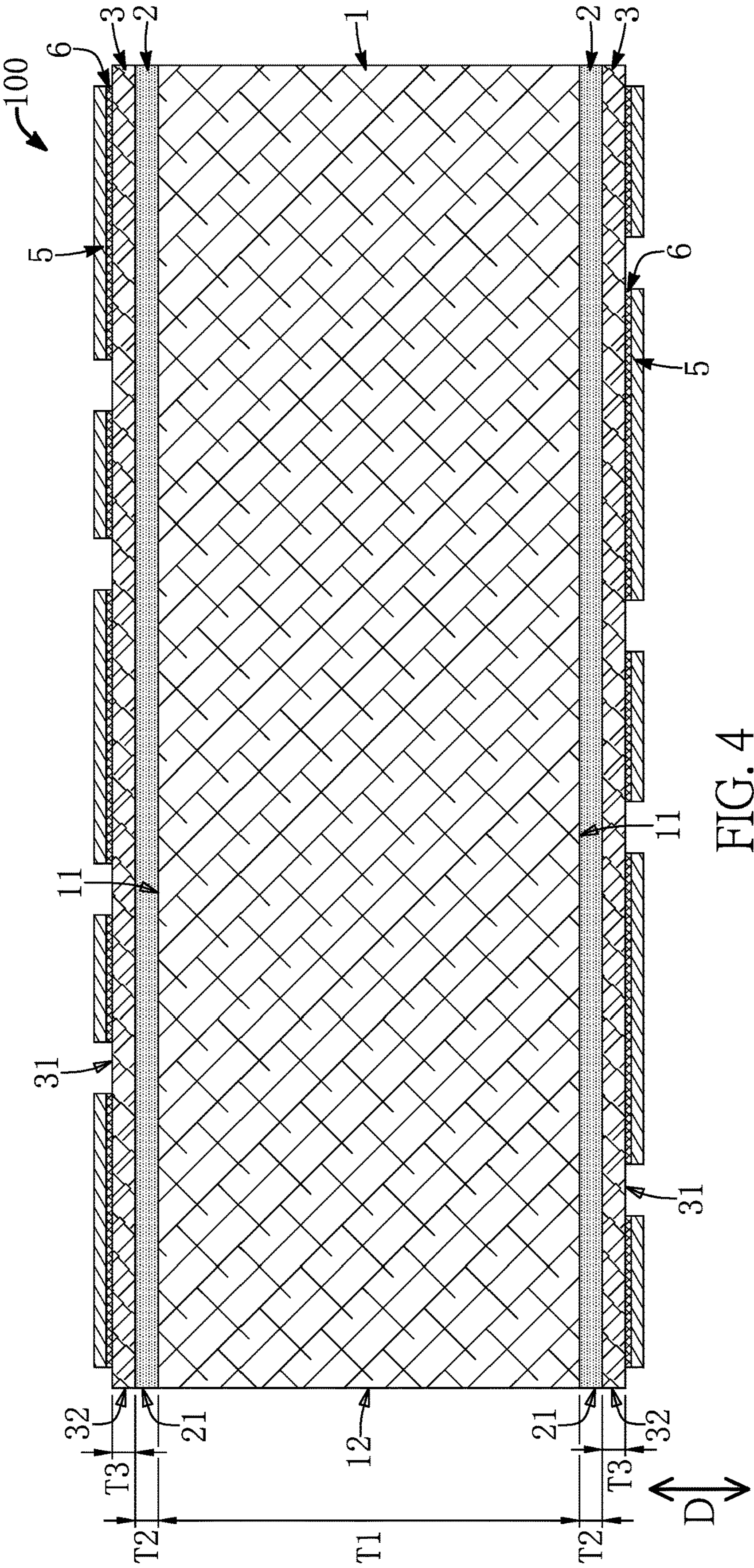
FIG. 4 is a schematic cross-sectional view of the composite ceramic substrate according to a third embodiment of the present disclosure.

Referring to FIG. 4, a third embodiment of the present disclosure, which is similar to the first embodiment of the present disclosure, is provided. For the sake of brevity, descriptions of the same components in the first and third embodiments of the present disclosure will be omitted herein, and the following description only discloses different features between the first and third embodiments.

In the present embodiment, the nitride ceramic core layer 1 is an aluminum nitride layer, and each of the two ceramic covering layers 3 is an aluminum oxide layer or a zirconia toughened alumina layer, so that the composite ceramic substrate 100 can further include two copper layers 5 that are respectively eutectic-connected to the outer surfaces 31 of the two ceramic covering layers 3 in a direct bonded copper (DBC) manner. In other words, any one of the two copper layers 5 in the present embodiment can be referred to as a DBC layer. Each of the two copper layers 5 and a corresponding one of the two ceramic covering layers 3 connected thereto jointly form a eutectic connection layer 6 for reinforcing the connection strength therebetween, but the present disclosure is not limited thereto. For example, in other embodiments of the present disclosure not shown in the drawings, the two copper layers 5 can be respectively formed on the outer surfaces 31 of the two ceramic covering layers 3 in an active metal brazing (AMB) manner; in other words, any one of the two copper layers 5 in the present embodiment can be referred to as an AMB layer.

Accordingly, the composite ceramic substrate 100 of the present disclosure is provided with a specific multi-layer configuration, where the two opposite sides of the aluminum nitride layer are respectively provided with the two aluminum oxide layers (or the two zirconia toughened alumina layers), so that each of the two copper layers 5 and a corresponding one of the two aluminum nitride layers (or a corresponding one of the two zirconia toughened alumina layers) can have a high bonding force by the DBC manner or the AMB manner, thereby effectively solving a problem associated with a conventional aluminum nitride ceramic substrate that cannot be used in the DBC manner or the AMB manner.

It should be noted that the composite ceramic substrate 100 provided by the present embodiment is limited to having the specific multi-layer configuration. In other words, according to design requirements, the composite ceramic substrate 100 provided by the present embodiment can be regarded as consisting of the aluminum nitride layer, the two composite layers 2 respectively formed on the two opposite surfaces of the aluminum nitride layer, the two aluminum oxide layers (or the two zirconia toughened alumina layers) that are respectively formed on the two composite layers 2, and the two copper layers 5 that are respectively formed on the two aluminum oxide layers (or the two zirconia toughened alumina layers) in the DBC manner or the AMB manner, but the present disclosure is not limited thereto.

Fourth Embodiment

Figure 5:
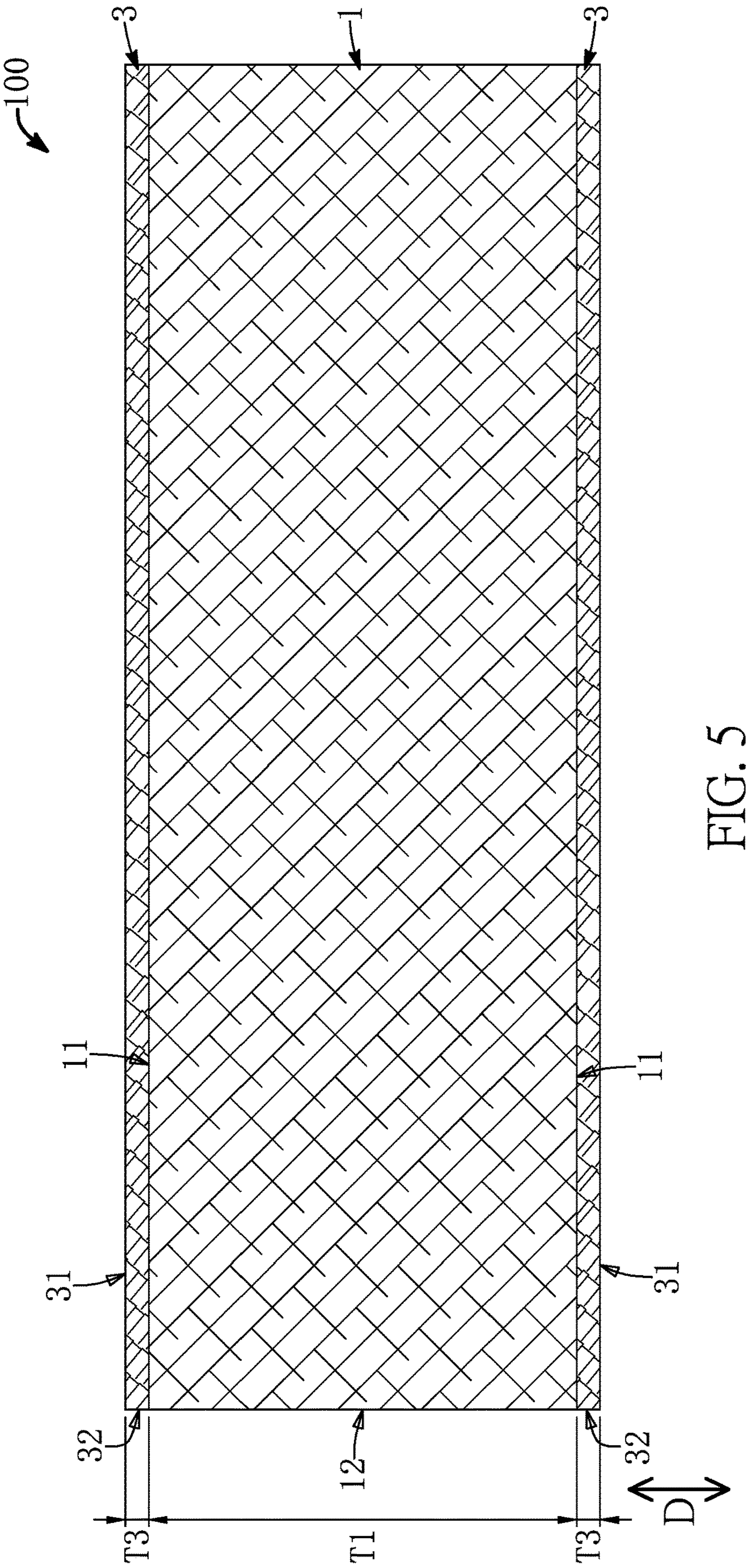
FIG. 5 is a schematic cross-sectional view of the composite ceramic substrate according to a fourth embodiment of the present disclosure.
Figure 6:
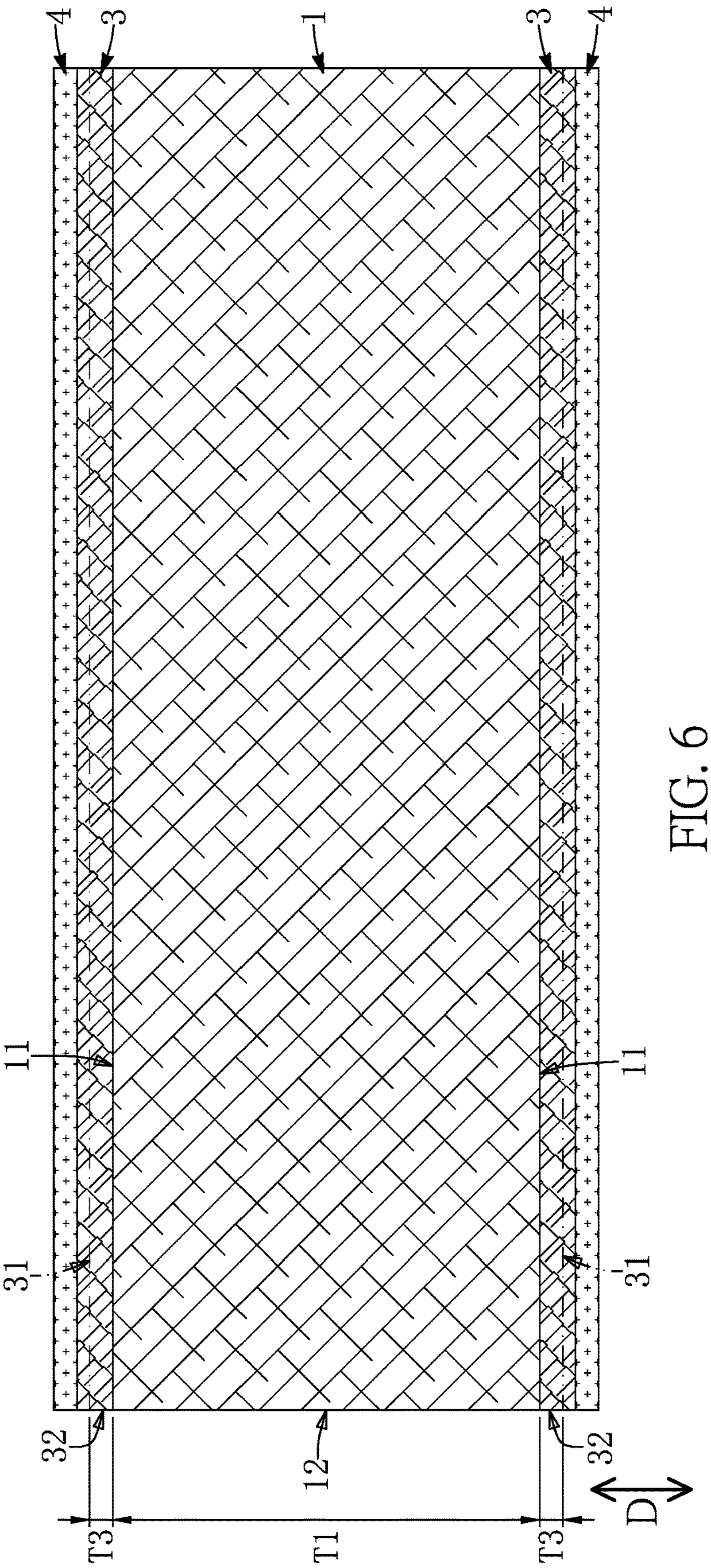
FIG. 6 is a schematic cross-sectional view showing the semifinished product of the composite ceramic substrate of FIG. 5.

Referring to FIG. 5 to FIG. 6, a fourth embodiment of the present disclosure is provided. As shown in FIG. 5, the present embodiment provides a composite ceramic substrate 100 having a multi-layer configuration, which includes a nitride ceramic core layer 1 and two ceramic covering layers 3 respectively formed on two opposite surfaces of the nitride ceramic core layer 1. It should be noted that any composite substrate having multiple ceramic layers is different from the nitride ceramic core layer 1 provided by the present embodiment.

The nitride ceramic core layer 1 is a silicon nitride ($Si_3N_4$) layer or an aluminum nitride (AlN) layer, and the nitride ceramic core layer 1 has two ceramic surfaces 11 spaced apart from each other along a thickness direction D by a predetermined thickness T1. In the present embodiment, the two ceramic surfaces 11 are flat and are substantially parallel to each other, and the predetermined thickness T1 can be at least 150 μm (e.g., the predetermined thickness T1 can be within a range from 150 μm to 1500 μm).

The two ceramic covering layers 3 are respectively coated (e.g., printed) onto the two ceramic surfaces 11 of the nitride ceramic core layer 1 to be jointly sintered together. Before that (e.g., before the above sintering process), as shown in FIG. 6, the two ceramic covering layers 3 can be provided with two isolation layers 4 respectively formed on outer sides thereof, and the two composite layers 2, the two ceramic covering layers 3, and the two isolation layers 4 are sintered to the nitride ceramic core layer 1 at a temperature of 1650° C. to 1900° C. so as to jointly become a stacked structure. Finally, as shown in FIG. 5, the stacked structure can be processed in a physical manner (e.g., a sandblasting manner) to remove the two isolation layers 4 and to reduce a thickness T3 of each of the two ceramic covering layers 3, until the thickness T3 of each of the two ceramic covering layers 3 is within a range from 5 μm to 50 μm.

Each of the two isolation layers 4 can be a boron nitride (BN) layer or an aluminum nitride layer. Moreover, an outer surface 31 of each of the two ceramic covering layers 3 in the present embodiment is a processed surface that is formed in the physical manner (e.g., the sandblasting manner) and that is preferably parallel to any one of the two ceramic surfaces 11. Accordingly, a flatness and an overall thickness of the composite ceramic substrate 100 in the present embodiment can be precisely controlled through the two processed surfaces. For example, a sum of the thicknesses T3 of the two ceramic covering layers 3 is less than or equal to the predetermined thickness T1.

Specifically, the material of each of the two ceramic covering layers 3 is limited to being different from the material of the nitride ceramic core layer 1. For example, when the nitride ceramic core layer 1 is a silicon nitride ($Si_3N_4$) layer, each of the two ceramic covering layers 3 can be an aluminum nitride (AlN) layer, an aluminum oxide ($Al_2O_3$) layer, or a zirconia toughened alumina (ZTA) layer; Or, when the nitride ceramic core layer 1 is an aluminum nitride layer, each of the two ceramic covering layers 3 can be a silicon nitride layer, an aluminum oxide layer, or a zirconia toughened alumina layer, but the present disclosure is not limited thereto.

In other words, each of the two ceramic covering layers 3 overlaps with at least 80% of an area of a corresponding one of the two ceramic surfaces 11 along the thickness direction D. In the present embodiment, outer lateral sides 12 of the nitride ceramic core layer 1 and outer lateral sides 32 of the two ceramic covering layers 3 are flush (or coplanar) with each other along the thickness direction D; that is to say, a portion of the nitride ceramic core layer 1 exposed in the external environment provided by the present embodiment can only be the outer lateral sides 12. Moreover, with respect to the nitride ceramic core layer 1, any one of the two ceramic covering layers 3 is mirror-symmetrical to another one of the two ceramic covering layers 3, but the present disclosure is not limited thereto.

In summary, the composite ceramic substrate 100 of the present disclosure is provided with a specific multi-layer configuration (e.g., the two opposite sides of the nitride ceramic core layer 1 are respectively provided with the two ceramic covering layers 3 being made of the material different from that of the nitride ceramic core layer 1) that is different from the conventional configuration, so that the composite ceramic substrate 100 can have a composite effect to expand its range of application and meet more diverse requirements.

It should be noted that the composite ceramic substrate 100 provided by the present embodiment is limited to having the specific multi-layer configuration. In other words, according to design requirements, the composite ceramic substrate 100 provided by the present embodiment can be regarded as consisting of the nitride ceramic core layer 1 and the two ceramic covering layers 3 that are respectively formed on the two opposite surfaces of the nitride ceramic core layer 1, but the present disclosure is not limited thereto.

In addition, the composite ceramic substrate 100 can be a silicon nitride ceramic substrate having multiple layers of different crystal structures. Specifically, the nitride ceramic core layer 1 is a silicon nitride layer having a first α-phase crystal structure and a first β-phase crystal structure. Moreover, a weight percentage of the first α-phase crystal structure of the nitride ceramic core layer is less than a weight percentage of the first β-phase crystal structure of the nitride ceramic core layer. For example, in the nitride ceramic core layer 1, the weight percentage of the first β-phase crystal structure can be at least 150% of the weight percentage of the first α-phase crystal structure, but the present disclosure is not limited thereto.

Moreover, each of the two ceramic covering layers 3 is a silicon nitride layer having a second α-phase crystal structure and a second β-phase crystal structure. In each of the two ceramic covering layers 3, a weight percentage of the second α-phase crystal structure is greater than a weight percentage of the second β-phase crystal structure. For example, in each of the two ceramic covering layers 3, the weight percentage of the second α-phase crystal structure is at least 150% of the weight percentage of the second β-phase crystal structure, but the present disclosure is not limited thereto.

In summary, for the composite ceramic substrate 100 of the present embodiment, the weight percentage of the α-phase crystal structure of each the two ceramic covering layers 3 is higher than that of the nitride ceramic core layer 1, thereby effectively increasing a bonding force of the composite ceramic substrate 100 for a metallic conductor.

Fifth Embodiment

Figure 7:
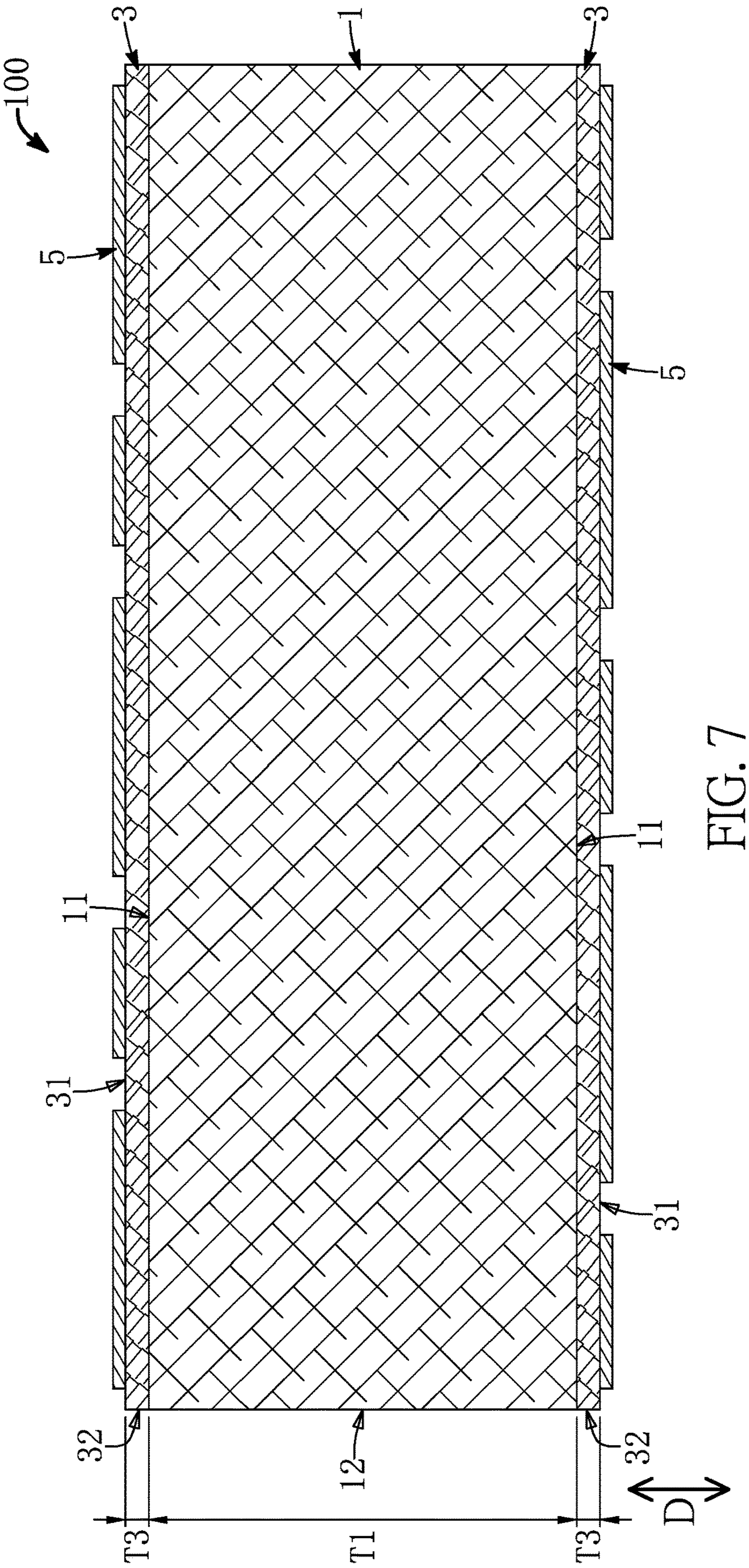
FIG. 7 is a schematic cross-sectional view of the composite ceramic substrate according to a fifth embodiment of the present disclosure.

Referring to FIG. 7, a fifth embodiment of the present disclosure, which is similar to the fourth embodiment of the present disclosure, is provided. For the sake of brevity, descriptions of the same components in the fourth and fifth embodiments of the present disclosure will be omitted herein, and the following description only discloses different features between the fourth and fifth embodiments.

In the present embodiment, the nitride ceramic core layer 1 is a silicon nitride layer, and each of the two ceramic covering layers 3 is an aluminum nitride layer, so that the composite ceramic substrate 100 can further include two copper layers 5 respectively formed on the outer surfaces 31 of the two ceramic covering layers 3 in a direct plated copper (DPC) manner. In other words, any one of the two copper layers 5 in the present embodiment can be referred to as a DPC layer.

Accordingly, the composite ceramic substrate 100 of the present disclosure is provided with a specific multi-layer configuration, where the two opposite sides of the silicon nitride layer are respectively provided with the two aluminum nitride layers, so that each of the two copper layers 5 and a corresponding one of the two aluminum nitride layers can have a high bonding force by the DPC manner, thereby effectively solving a problem associated with a conventional silicon nitride ceramic substrate that cannot be used in the DPC manner.

It should be noted that the composite ceramic substrate 100 provided by the present embodiment is limited to having the specific multi-layer configuration. In other words, according to design requirements, the composite ceramic substrate 100 provided by the present embodiment can be regarded as consisting of the silicon nitride layer, the two aluminum nitride layers respectively formed on the two opposite surfaces of the silicon nitride layer, and the two copper layers 5 that are respectively formed on the two aluminum nitride layers in the DPC manner, but the present disclosure is not limited thereto.

Sixth Embodiment

Figure 8:
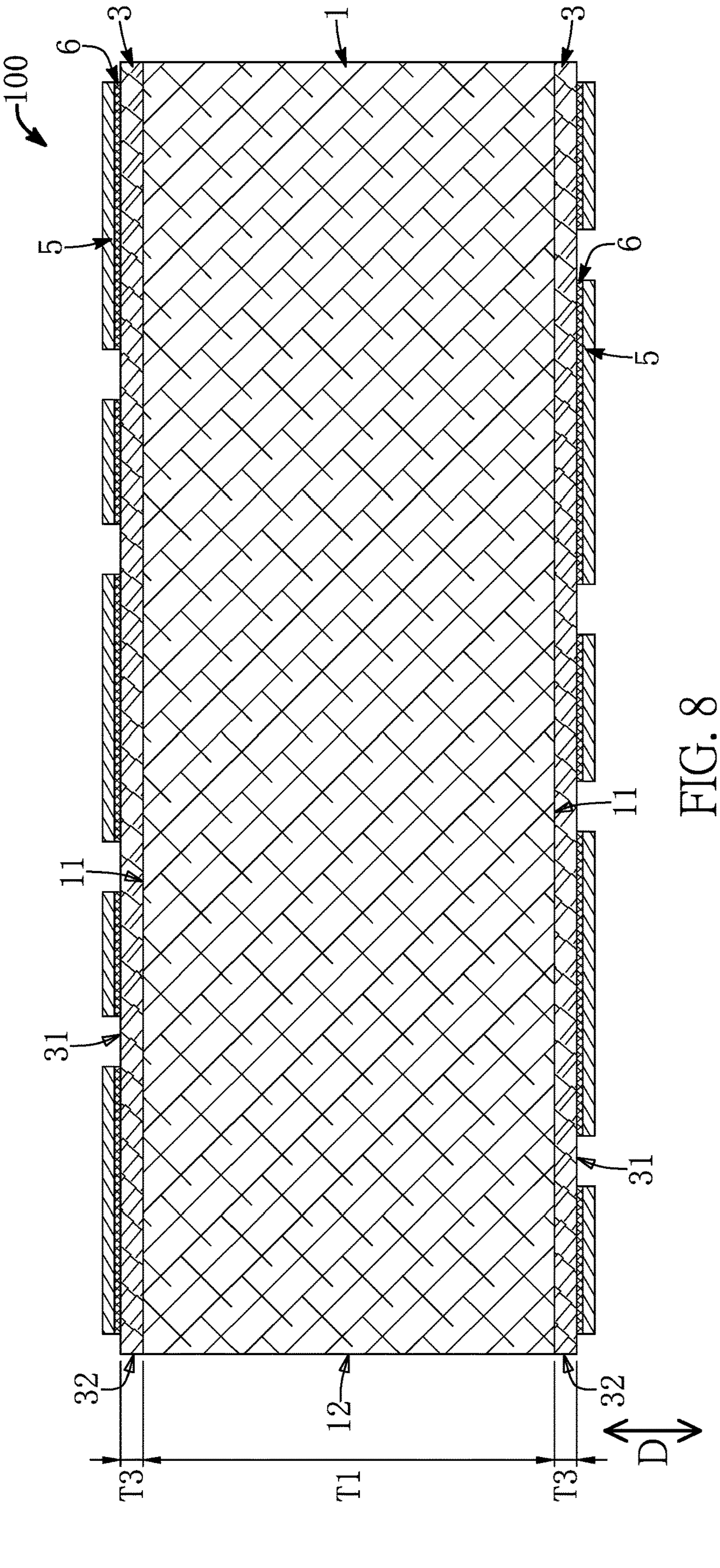
FIG. 8 is a schematic cross-sectional view of the composite ceramic substrate according to a sixth embodiment of the present disclosure.

Referring to FIG. 8, a sixth embodiment of the present disclosure, which is similar to the fourth embodiment of the present disclosure, is provided. For the sake of brevity, descriptions of the same components in the fourth and sixth embodiments of the present disclosure will be omitted herein, and the following description only discloses different features between the fourth and sixth embodiments.

In the present embodiment, the nitride ceramic core layer 1 is an aluminum nitride layer, and each of the two ceramic covering layers 3 is an aluminum oxide layer or a zirconia toughened alumina layer, so that the composite ceramic substrate 100 can further include two copper layers 5 that are respectively eutectic-connected to the outer surfaces 31 of the two ceramic covering layers 3 in a direct bonded copper (DBC) manner. In other words, any one of the two copper layers 5 in the present embodiment can be referred to as a DBC layer. Each of the two copper layers 5 and a corresponding one of the two ceramic covering layers 3 connected thereto jointly form an eutectic connection layer 6 for reinforcing the connection strength therebetween, but the present disclosure is not limited thereto. For example, in other embodiments of the present disclosure not shown in the drawings, the two copper layers 5 can be respectively formed on the outer surfaces 31 of the two ceramic covering layers 3 in an active metal brazing (AMB) manner; in other words, any one of the two copper layers 5 in the present embodiment can be referred to as an AMB layer.

Accordingly, the composite ceramic substrate 100 of the present disclosure is provided with a specific multi-layer configuration, where the two opposite sides of the aluminum nitride layer are respectively provided with the two aluminum oxide layers (or the two zirconia toughened alumina layers), so that each of the two copper layers 5 and a corresponding one of the two aluminum nitride layers (or a corresponding one of the two zirconia toughened alumina layers) can have a high bonding force by the DBC manner or the AMB manner, thereby effectively solving a problem associated with a conventional aluminum nitride ceramic substrate that cannot be used in the DBC manner or the AMB manner.

It should be noted that the composite ceramic substrate 100 provided by the present embodiment is limited to having the specific multi-layer configuration. In other words, according to design requirements, the composite ceramic substrate 100 provided by the present embodiment can be regarded as consisting of the aluminum nitride layer, the two aluminum oxide layers (or the two zirconia toughened alumina layers) respectively formed on the two opposite surfaces of the aluminum nitride layer, and the two copper layers 5 that are respectively formed on the two aluminum oxide layers (or the two zirconia toughened alumina layers) in the DBC manner or the AMB manner, but the present disclosure is not limited thereto.

Seventh Embodiment

Figure 9:
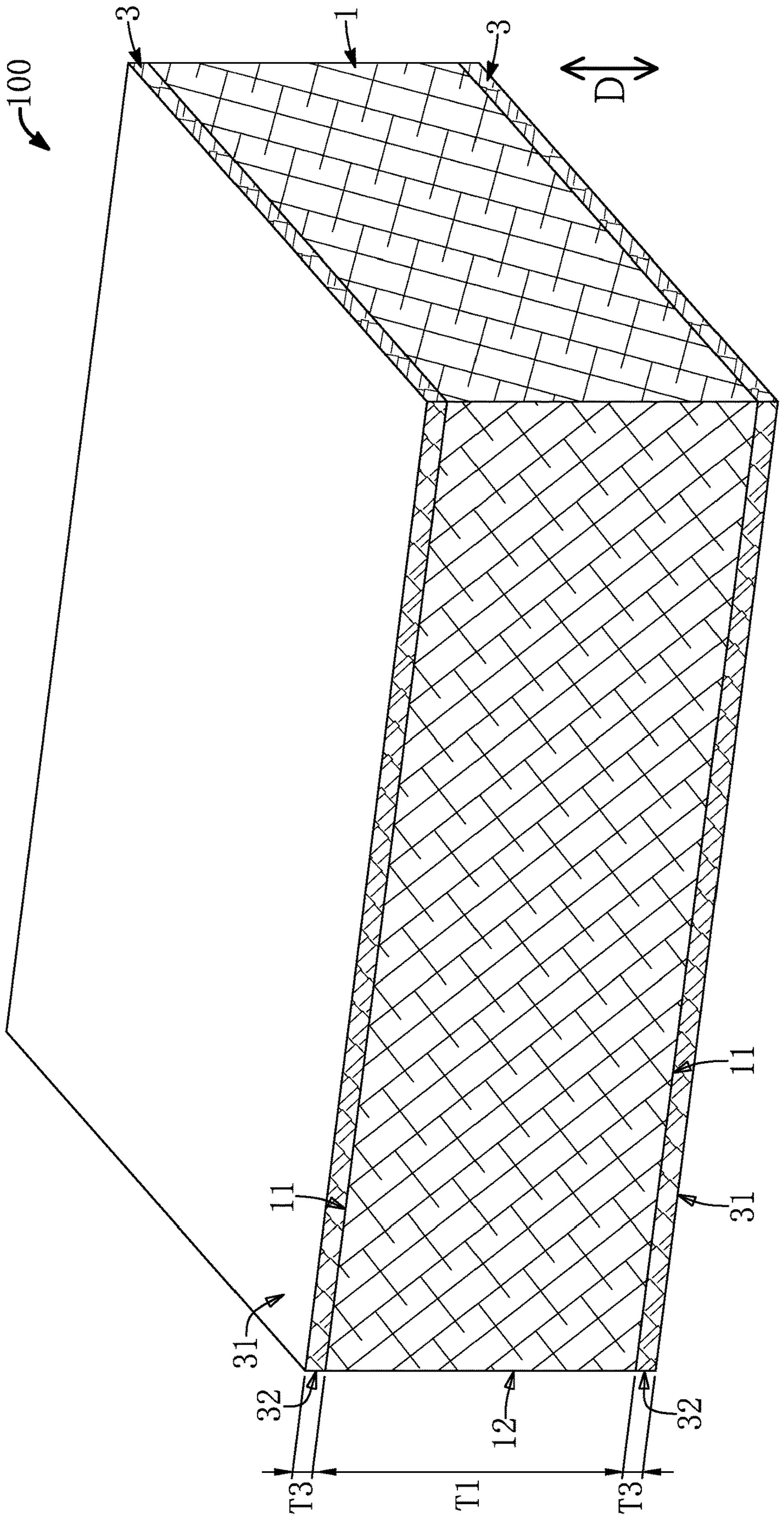
FIG. 9 is a schematic cross-sectional view of the composite ceramic substrate according to a seventh embodiment of the present disclosure.

Referring to FIG. 9, a seventh embodiment of the present disclosure provides a composite ceramic substrate 100 having a multi-layer configuration, which includes a nitride ceramic core layer 1 and two ceramic covering layers 3 respectively formed on two opposite surfaces of the nitride ceramic core layer 1. It should be noted that any composite substrate having multiple ceramic layers is different from the nitride ceramic core layer 1 provided by the present embodiment.

The nitride ceramic core layer 1 is an aluminum nitride (AlN) layer formed by sintering (substantially) spherical aluminum nitride powder. The nitride ceramic core layer 1 has two ceramic surfaces 11 spaced apart from each other along a thickness direction D by a predetermined thickness T1. In the present embodiment, the two ceramic surfaces 11 are flat and are substantially parallel to each other, and the predetermined thickness T1 can be at least 150 μm (e.g., the predetermined thickness T1 can be within a range from 150 μm to 1500 μm).

The two ceramic covering layers 3 are respectively coated (e.g., printed) onto the two ceramic surfaces 11 of the nitride ceramic core layer 1 to be jointly sintered together. Moreover, each of the two ceramic covering layers 3 has a thickness T3 that is preferably within a range from 5 μm to 50 μm. Each of the two ceramic covering layers 3 is a modified aluminum nitride layer formed by sintering (substantially) spherical aluminum nitride powder and modified powder. Specifically, the modified powder includes at least one of non-spherical (e.g., fibrous, plate-like, or rod-like) aluminum nitride powder and boron nitride powder.

In each of the two ceramic covering layers 3, a weight percentage of the (substantially) spherical aluminum nitride powder is greater than a weight percentage of the modified powder, and a specific value of the weight percentage of the (substantially) spherical aluminum nitride powder and a specific value of the weight percentage of the modified powder can be adjusted or changed according to design requirements and are not limited by the present embodiment. Accordingly, each of the two ceramic covering layers 3 in the present embodiment can be provided by mixing the (substantially) spherical aluminum nitride powder and the modified powder to obtain a toughness higher than that of the nitride ceramic core layer 1, and the nitride ceramic core layer 1 has a strength higher than that of each of the two ceramic covering layers 3, so that the composite ceramic substrate 100 can have a composite effect.

Moreover, an outer surface 31 of each of the two ceramic covering layers 3 in the present embodiment is a processed surface that is formed in the physical manner (e.g., the sandblasting manner) and that is preferably parallel to any one of the two ceramic surfaces 11. Accordingly, a flatness and an overall thickness of the composite ceramic substrate 100 in the present embodiment can be precisely controlled through the two processed surfaces. For example, a sum of the thicknesses T3 of the two ceramic covering layers 3 is less than or equal to the predetermined thickness T1.

In other words, each of the two ceramic covering layers 3 overlaps with at least 80% of an area of a corresponding one of the two ceramic surfaces 11 along the thickness direction D. In the present embodiment, outer lateral sides 12 of the nitride ceramic core layer 1 and outer lateral sides 32 of the two ceramic covering layers 3 are flush (or coplanar) with each other along the thickness direction D; that is to say, a portion of the nitride ceramic core layer 1 exposed in the external environment provided by the present embodiment can only be the outer lateral sides 12. Moreover, with respect to the nitride ceramic core layer 1, any one of the two ceramic covering layers 3 is mirror-symmetrical to another one of the two ceramic covering layers 3, but the present disclosure is not limited thereto.

In summary, the composite ceramic substrate 100 of the present disclosure is provided with a specific multi-layer configuration (e.g., the two opposite sides of the nitride ceramic core layer 1 are respectively provided with the two ceramic covering layers 3 being made of the material composition different from that of the nitride ceramic core layer 1) different from the conventional configuration, so that the composite ceramic substrate 100 can have a composite effect to expand its range of application and meet more diverse requirements.

It should be noted that the composite ceramic substrate 100 provided by the present embodiment is limited to having the specific multi-layer configuration. In other words, according to design requirements, the composite ceramic substrate 100 provided by the present embodiment can be regarded as consisting of the nitride ceramic core layer 1 and the two ceramic covering layers 3 that are respectively formed on the two opposite surfaces of the nitride ceramic core layer 1, but the present disclosure is not limited thereto.

Beneficial Effects of the Embodiments

In conclusion, the composite ceramic substrate of the present disclosure is provided with a specific multi-layer configuration (e.g., the two opposite sides of the nitride ceramic core layer are respectively provided with the two ceramic covering layers) that is different from the conventional configuration, so that the composite ceramic substrate can have a composite effect to expand its range of application and meet more diverse requirements.

Specifically, the composite ceramic substrate of the present disclosure is provided with a specific multi-layer configuration, where the two opposite sides of the silicon nitride layer are respectively provided with the two aluminum nitride layers, so that each of the two copper layers and a corresponding one of the two aluminum nitride layers can have a high bonding force by the DPC manner, thereby effectively solving a problem associated with a conventional silicon nitride ceramic substrate that cannot be used in the DPC manner.

Moreover, the composite ceramic substrate of the present disclosure is provided with a specific multi-layer configuration, where the two opposite sides of the aluminum nitride layer are respectively provided with the two aluminum oxide layers (or the two zirconia toughened alumina layers), so that each of the two copper layers and a corresponding one of the two aluminum nitride layers (or a corresponding one of the two zirconia toughened alumina layers) can have a high bonding force by the DBC manner or the AMB manner, thereby effectively solving a problem associated with a conventional aluminum nitride ceramic substrate that cannot be used in the DBC manner or the AMB manner.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A composite ceramic substrate having a multi-layer configuration, comprising:

a nitride ceramic core layer having two ceramic surfaces spaced apart from each other along a thickness direction by a predetermined thickness;

two composite layers respectively formed on the two ceramic surfaces of the nitride ceramic core layer; and two ceramic covering layers that are respectively coated onto the two composite layers to be jointly sintered to the nitride ceramic core layer, wherein a material of each of the two ceramic covering layers is different from a material of the nitride ceramic core layer, and a composite material of each of the two composite layers includes the material of the ceramic covering layer connected thereto and the material of the nitride ceramic core layer;

wherein each of the two ceramic covering layers overlaps with at least 80% of an area of a corresponding one of the two ceramic surfaces along the thickness direction, and a sum of thicknesses of the two ceramic covering layers and thicknesses of the two composite layers is less than or equal to the predetermined thickness.

2. The composite ceramic substrate according to claim 1, wherein the nitride ceramic core layer is a silicon nitride ($Si_3N_4$) layer, and each of the two ceramic covering layers is an aluminum nitride (AlN) layer, an aluminum oxide ($Al_2O_3$) layer, or a zirconia toughened alumina (ZTA) layer.

3. The composite ceramic substrate according to claim 1, wherein the nitride ceramic core layer is a silicon nitride layer, and each of the two ceramic covering layers is an aluminum nitride layer, and wherein the composite ceramic substrate further includes two copper layers respectively formed on outer surfaces of the two ceramic covering layers in a direct plated copper (DPC) manner.

4. The composite ceramic substrate according to claim 1, wherein the nitride ceramic core layer is an aluminum nitride layer, and each of the two ceramic covering layers is a silicon nitride layer.

5. The composite ceramic substrate according to claim 1, wherein the nitride ceramic core layer is an aluminum nitride layer, and each of the two ceramic covering layers is an aluminum oxide layer or a zirconia toughened alumina layer, and wherein the composite ceramic substrate further includes two copper layers that are respectively eutectic-connected to outer surfaces of the two ceramic covering layers in a direct bonded copper (DBC) manner or that are respectively formed on the outer surfaces of the two ceramic covering layers in an active metal brazing (AMB) manner.

6. The composite ceramic substrate according to claim 1, wherein outer lateral sides of the nitride ceramic core layer, outer lateral sides of the two composite layers, and outer lateral sides of the two ceramic covering layers are flush with each other along the thickness direction.

7. The composite ceramic substrate according to claim 6, wherein, with respect to the nitride ceramic core layer, any one of the two ceramic covering layers and the composite layer connected thereto are mirror-symmetrical to another one of the two ceramic covering layers and the composite layer connected thereto.

8. The composite ceramic substrate according to claim 1, wherein a thickness of any one of the two ceramic covering layers is greater than or equal to a thickness of a corresponding one of the two composite layers, and is within a range from 5 μm to 50 μm.

9. A composite ceramic substrate having a multi-layer configuration, comprising:

a nitride ceramic core layer having two ceramic surfaces spaced apart from each other along a thickness direction by a predetermined thickness; and two ceramic layers that are insulative and that are respectively coated onto the two ceramic surfaces of the nitride ceramic core layer to be jointly sintered together;

wherein each of the two ceramic layers overlaps with at least 80% of an area of a corresponding one of the two ceramic surfaces along the thickness direction, and a sum of thicknesses of the two ceramic layers is less than or equal to the predetermined thickness.

10. The composite ceramic substrate according to claim 9, wherein the nitride ceramic core layer is a silicon nitride ($Si_3N_4$) layer, and each of the two ceramic layers is an aluminum nitride (AlN) layer, an aluminum oxide ($Al_2O_3$) layer, or a zirconia toughened alumina (ZTA) layer.

11. The composite ceramic substrate according to claim 9, wherein the nitride ceramic core layer is a silicon nitride layer, and each of the two ceramic layers is an aluminum nitride layer, and wherein the composite ceramic substrate further includes two copper layers respectively formed on outer surfaces of the two ceramic layers in a direct plated copper (DPC) manner.

12. The composite ceramic substrate according to claim 9, wherein the nitride ceramic core layer is an aluminum nitride (AlN) layer, and each of the two ceramic layers is a silicon nitride layer.

13. The composite ceramic substrate according to claim 9, wherein the nitride ceramic core layer is an aluminum nitride layer, and each of the two ceramic layers is an aluminum oxide layer or a zirconia toughened alumina layer, and wherein the composite ceramic substrate further includes two copper layers that are respectively eutectic-connected to outer surfaces of the two ceramic layers in a direct bonded copper (DBC) manner or that are respectively formed on the outer surfaces of the two ceramic layers in an active metal brazing (AMB) manner.

14. The composite ceramic substrate according to claim 9, wherein a material of each of the two ceramic layers is different from a material of the nitride ceramic core layer, and outer lateral sides of the nitride ceramic core layer and outer lateral sides of the two ceramic layers are flush with each other along the thickness direction, and a thickness of any one of the two ceramic layers is within a range from 5 μm to 50 μm, and wherein with respect to the nitride ceramic core layer, any one of the two ceramic layers is mirror-symmetrical to another one of the two ceramic layers.

15. The composite ceramic substrate according to claim 9, wherein the nitride ceramic core layer is an aluminum nitride layer formed by sintering spherical aluminum nitride powder, and each of the two ceramic layers is a modified aluminum nitride layer formed by sintering spherical aluminum nitride powder and modified powder, and wherein the modified powder includes at least one of non-spherical aluminum nitride powder and boron nitride powder.

16. The composite ceramic substrate according to claim 15, wherein, in each of the two ceramic layers, a weight percentage of the spherical aluminum nitride powder is greater than a weight percentage of the modified powder.

* * * * *